US010810069B2

(12) United States Patent
Ghosh et al.

(10) Patent No.: US 10,810,069 B2
(45) Date of Patent: Oct. 20, 2020

(54) DATA PROCESSING FOR COMPONENT FAILURE DETERMINATION

(71) Applicant: Accenture Global Solutions Limited, Dublin (IE)

(72) Inventors: Bhaskar Ghosh, Bangalore (IN); Mohan Sekhar, Bangalore (IN); Rajendra T. Prasad, Bangalore (IN); Rajesh Nagarajan, Chennai (IN); Balaji Venkateswaran, Chennai (IN); Purnima Jagannathan, Chennai (IN); Roopalaxmi Manjunath, Bangalore (IN); Vijayaraghavan Koushik, Chennai (IN)

(73) Assignee: Accenture Global Solutions Limited, Dublin (IE)

( * ) Notice: Subject to any disclaimer, the term of this patent is extended or adjusted under 35 U.S.C. 154(b) by 210 days.

(21) Appl. No.: 16/037,770

(22) Filed: Jul. 17, 2018

(65) Prior Publication Data
US 2020/0026589 A1 Jan. 23, 2020

(51) Int. Cl.
*G06F 11/08* (2006.01)
*G06F 11/00* (2006.01)
(Continued)

(52) U.S. Cl.
CPC .............. *G06F 11/008* (2013.01); *G06F 8/70* (2013.01); *G06F 9/4881* (2013.01); *G06F 11/0793* (2013.01); *G06F 11/3409* (2013.01); *G06F 11/3447* (2013.01); *G06F 11/3476* (2013.01); *H04L 41/5074* (2013.01); *G06F 2201/81* (2013.01); *G06N 3/02* (2013.01)

(58) Field of Classification Search
CPC .............. G06F 11/008; G06F 11/0793; G06F 11/3409; G06F 11/3447; G06F 11/3476; G06F 8/70; G06F 9/4881; G06F 2201/81; H04L 41/5074; G06N 3/02
See application file for complete search history.

(56) References Cited

U.S. PATENT DOCUMENTS 10,402,733 B1 * 9/2019 Li .......................... G06N 7/005
2008/0250265 A1 * 10/2008 Chang ................. G06F 11/0709
714/4.12

(Continued)

FOREIGN PATENT DOCUMENTS

CN 106095639 * 11/2016 .......... G06F 11/3006

*Primary Examiner* — Kamini B Patel
(74) *Attorney, Agent, or Firm* — Harrity & Harrity, LLP

(57) ABSTRACT

A component analysis platform may communicate with one or more devices to obtain prediction data relating to a type of component. The component analysis platform may process the prediction data to determine a set of predictors for failure of an instance of the component, and may generate a model for failure of the instance of the component based on the set of predictors. The component analysis platform may monitor the instance of the component to obtain component data relating to the instance of the component. The component analysis platform may determine, using the model and based on the component data relating to the instance of the component, a predicted failure for the instance of the component. The component analysis platform may perform a response action related to the predicted failure.

20 Claims, 7 Drawing Sheets

(51) Int. Cl.
*G06F 11/07* (2006.01)
*G06F 11/34* (2006.01)
*G06F 8/70* (2018.01)
*H04L 12/24* (2006.01)
*G06F 9/48* (2006.01)
*G06N 3/02* (2006.01)

(56) References Cited

U.S. PATENT DOCUMENTS

| | | | |
|---|---|---|---|
| 2009/0171718 A1* | 7/2009 | Barlow | H04L 41/50 |
| | | | 705/7.27 |
| 2009/0187534 A1* | 7/2009 | Broll | G06F 16/217 |
| 2011/0289029 A1* | 11/2011 | Bisdikian | G06F 8/355 |
| | | | 706/13 |
| 2012/0203536 A1 | 8/2012 | Gangemi et al. | |
| 2013/0346594 A1 | 12/2013 | Banerjee et al. | |
| 2015/0227838 A1* | 8/2015 | Wang | G06N 20/00 |
| | | | 706/12 |
| 2017/0344400 A1* | 11/2017 | Birke | G06F 9/45533 |
| 2019/0065343 A1* | 2/2019 | Li | G06N 3/088 |
| 2019/0243552 A1* | 8/2019 | Maharana | G06F 12/1081 |
| 2019/0243570 A1* | 8/2019 | Mittal | G06F 3/0658 |

* cited by examiner

DATA PROCESSING FOR COMPONENT FAILURE DETERMINATION

BACKGROUND

Software development is, generally, the end-to-end process of creating software programs for a system, embodying stages throughout a system's development life cycle. The traditional model of development, such as the waterfall model, may include the phases of identification of required software, analysis and specification of software requirements, software design, programming (i.e., coding), testing, and maintenance of code. Software project management includes involvement of the end users, communication among customers/clients, users, and software developers, articulation of project goals, accurate estimation of resources, and specification of system requirements. A project management platform may be deployed to automate some tasks of software development, such as coding tasks, testing tasks, ticket resolution tasks, and/or the like.

During a maintenance of code phase, which may be termed an application maintenance project, a project management platform may be used to perform system monitoring, to identify issues, and to resolve the issues. For example, the project management platform may receive trouble tickets from code users identifying code errors, and may assign the trouble tickets to developers so that the developers can resolve the code errors. Error management may be a reactive process, whereby errors are identified as the errors occur and are observed by users.

SUMMARY

According to some implementations, a device may include one or more memories, and one or more processors, communicatively coupled to the one or more memories, to communicate with one or more devices to obtain prediction data relating to a type of component. The one or more processors may process the prediction data to determine a set of predictors for failure of an instance of the component, and may generate a model for failure of the instance of the component based on the set of predictors. The one or more processors may monitor the instance of the component to obtain component data relating to the instance of the component, and determine, using the model and based on the component data relating to the instance of the component, a predicted failure for the instance of the component. The one or more processors may perform a response action related to the predicted failure.

According to some implementations, a method may include communicating, by a first device, with a second device to obtain prediction data relating to a type of component. The method may include generating, by the first device, a model for failure of an instance of the component based on a set of predictors relating to failure of the instance of the component, and the prediction data relating to the type of the component. The method may include monitoring, by the first device, the instance of the component to obtain component data relating to the instance of the component. The method may include determining, by the first device and using the model, a predicted failure for the instance of the component based on the component data relating to the instance of the component, and communicating, by the first device, with a third device to transmit an alert relating to the predicted failure.

According to some implementations, a non-transitory computer-readable medium may store instructions that include one or more instructions that, when executed by one or more processors of a device, cause the one or more processors to communicate with one or more devices to obtain prediction data relating to a type of component. The one or more instructions may cause the one or more processors to process the prediction data to determine a set of predictors for failure of an instance of the component, and generate a model for failure of the instance of the component based on the set of predictors. The one or more instructions may cause the one or more processors to monitor the instance of the component to obtain component data relating to the instance of the component. The one or more instructions may cause the one or more processors to determine, using the model and based on the component data relating to the instance of the component, a predicted threshold ticket inflow based on monitoring the instance of the component, and perform a response action to accommodate the predicted threshold ticket inflow.

DETAILED DESCRIPTION

Figure 1A:
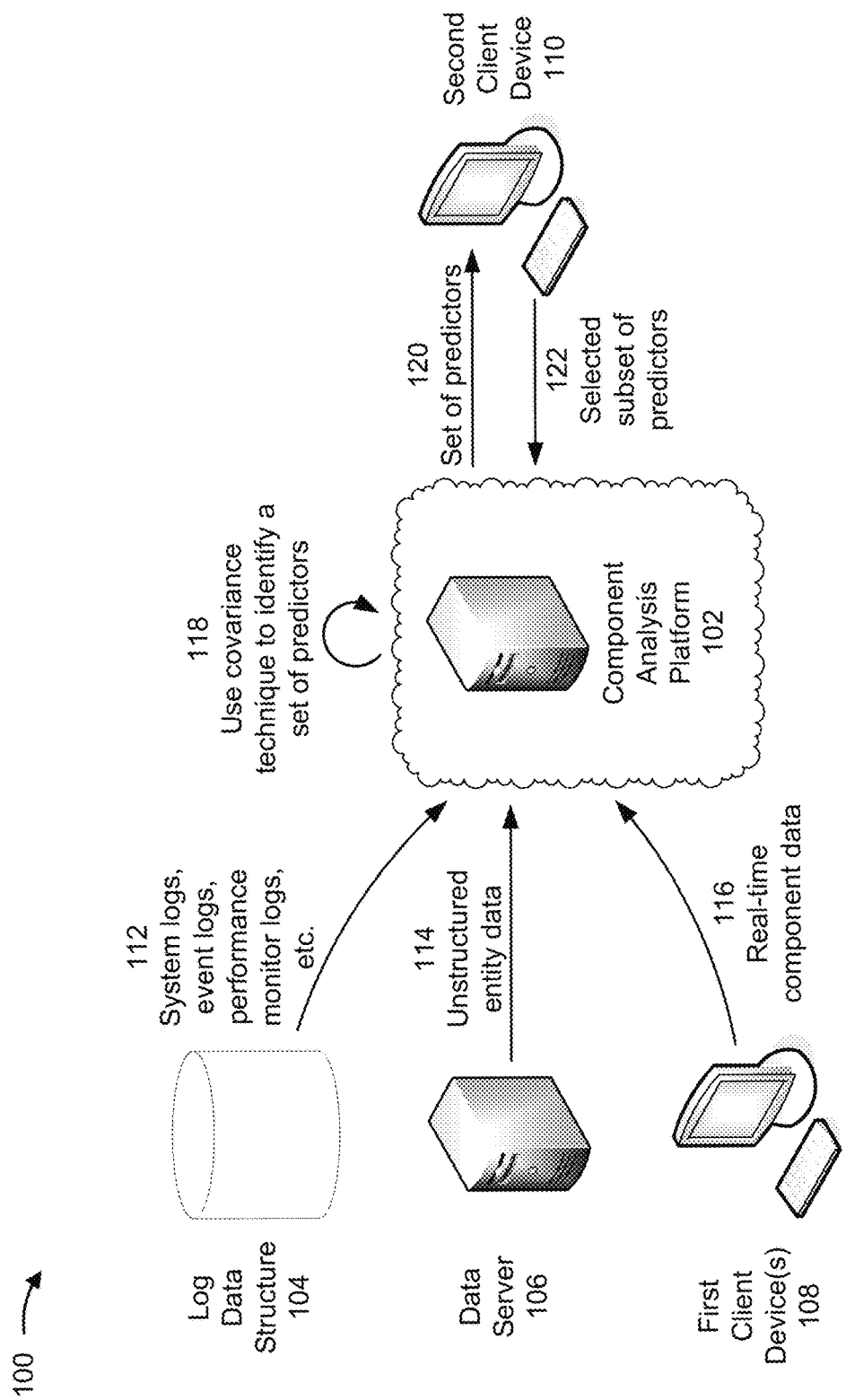
FIGS. 1A and 1B are diagrams of an example implementation described herein.

The following detailed description of example implementations refers to the accompanying drawings. The same reference numbers in different drawings may identify the same or similar elements.

A project manager may manage a software development project (e.g., an instance of a component) for a client. The project manager may manage a set of developers to author program code for the software development project to satisfy requirements provided by the client. For example, the client may provide requirements relating to accessibility, functionality, security, error management, and/or the like. After the project is completed, the client may test the program code to determine that the program code satisfies the requirements, and may publish the program code for use by a set of users. Another project manager may resolve ongoing issues relating to the program code. For example, when a user of the program code identifies an error, the user may submit a ticket relating to the error for resolution by the other project manager.

However, error management for a project may be resource intensive, while also being prone to human error. For example, when a particular software instance used by a particular client fails, the particular client may experience business disruptions that result in poor user experience. Similarly, when a code segment fails to operate in an expected manner, the particular client may experience increased utilization of memory resources, processing resources, and/or the like as a result of the code segment failing to operate in the expected manner (e.g., failing to perform garbage collecting, failing to release memory, failing to delete stored information, etc.). Similarly, when a business process fails, such as an error management process failing as a result of an insufficient quantity of developers being assigned to resolve tickets, the particular client may experience increased utilization of memory resources, processing resources, and/or the like.

Moreover, reactive, manual error management to address component failures may lead to excessive use of computing resources. For example, manual authoring of program code, manual assignment of work schedules for subordinates, and/or the like may utilize more computing resources than automated authoring of program code, automated assignment of work schedules, and/or the like. In other cases, maintaining code for a project (with or without human intervention) may be difficult due to a project management platform receiving a large volume of data relating to multiple aspects of a project. This may result in high computer processing and/or storage costs.

A project management platform may be deployed to automatically manage multiple phases of a project, including a development phase of a project, a testing phase of a project, a use phase of a project, and/or the like. The project management platform may include integration of artificial intelligence and/or machine learning components to permit natural language based interaction with the project management platform. Nevertheless, such management may be reactive, and the disruptions from reactive project management may result in a business using excessive computing resources to work around a disruption. Moreover, reactive project management may result in errors persisting for a relatively long period of time, because errors may occur when developers are unavailable to resolve the errors (e.g., due to task assignment to other errors, due to errors occurring outside of normal business hours, due to errors occurring in software components for which developers lack skills, and/or the like).

Some implementations, described herein, may provide proactive monitoring of components and prediction of component failure. For example, a component analysis platform may determine a set of predictors to identify failure of a component, may establish a threshold for the set of predictors, may proactively predict failure of the component based on monitoring the component and data relating to the set of predictors, and may proactively implement response actions to resolve the predicted component failure. In this case, a component may refer to a code segment, an application provided to a client, a business process that includes use of a code segment or an application, and/or the like. In this way, the component analysis platform may reduce a utilization of computing resources relative to reactive component failure monitoring by reducing a likelihood of component failure, identifying component failure fixes in advance of component failure to reduce a duration of a component failure, and/or the like.

In this way, prediction, detection, and/or mitigation of component failures is automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. For example, currently there does not exist a technique to accurately predict component failure using predictors obtained from data relating to the component. Finally, automating the process for predicting component failure conserves computing resources (e.g., processor resources, memory resources, and/or the like) that would otherwise be wasted in attempting to detect component failures, and computing resources of the user device that would be wasted executing code segments, program code, software, and/or the like during a failure.

Figure 1B:
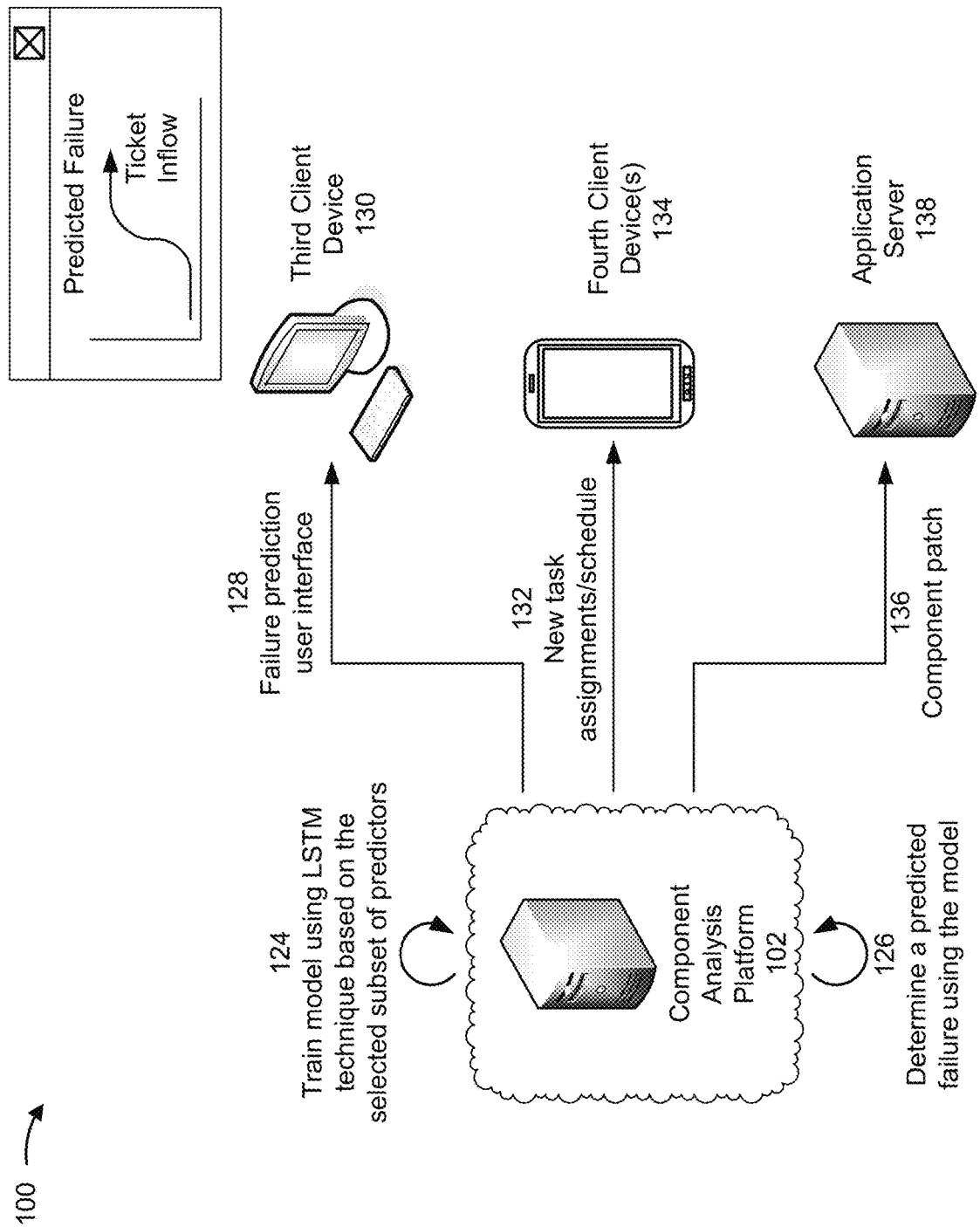

FIGS. 1A and 1B are diagrams of an example implementation 100 described herein. As shown in FIG. 1A, example implementation 100 includes a component analysis platform 102, a log data structure 104, a data server 106, one or more first client devices 108, and a second client device 110.

As further shown in FIG. 1A, component analysis platform 102 may communicate with one or more devices, such as log data structure 104, data server 106, first client device 108, and/or the like, to obtain prediction data relating to a type of component. For example, to predict a failure for an instance of a software component (e.g., a particular application deployed for a particular client), component analysis platform 102 may communicate with log data structure 104 to obtain log data 112, such as system logs, event logs, performance monitor logs, processor logs, database logs, and/or the like. Additionally, or alternatively, component analysis platform 102 may communicate with data server 106 to obtain entity data 114 (e.g., data relating to the particular client). For example, component analysis platform 102 may obtain data identifying other components associated with the particular client, data identifying employees of the particular client, data relating to computing resource availability of the particular client, and/or the like. In this case, the entity data 114 may be unstructured, and component analysis platform 102 may pre-process the entity data 114 to structure the entity data 114 for processing. For example, component analysis platform 102 may convert textual entity data 114 (e.g., log data) into numeric data, and may convert unstructured entity data 114 into structured column data. Additionally, or alternatively, component analysis platform 102 may monitor the one or more first client devices 108 to obtain component data 116 relating to the instance of the component in real-time, in near-real time, and/or the like. For example, component analysis platform 102 may obtain data identifying a state of a particular code segment deployed for a particular client, data identifying a processing utilization associated with executing an instance of software deployed for a particular client, and/or the like. Additionally, or alternatively, component analysis platform 102 may monitor a database, a web server, an application server, a processor, and/or the like relating to the component, a group of components, and/or the like.

As further shown in FIG. 1A, and by reference number 118, component analysis platform 102 may process the prediction data to determine a set of predictors for a failure of the instance of the component, such as by using a covariance technique. A predictor may refer a variable relating to a value for an instance of a component (e.g., a processing utilization variable, a ticket inflow variable, a sentiment analysis variable based on a sentiment analysis performed on natural language of tickets, etc.), a variable relating to a state of the instance of the component (e.g., a state where an error is thrown, a state where a warning is thrown, etc.), and/or the like. For example, component analysis platform 102 may utilize data relating to other instances of the component, data relating to other components determined to be similar (e.g., based on a similarity analysis of code, based on being used for a same entity, based on being used for a similar entity with regard to business type, business size, etc.), and/or the like and data identifying failures to determine the set of predictors. In this case, the covariance technique may be a Pearson coefficient based technique to determine a joint variability of different values in the prediction data. Based on multiple types of values being determined to be associated with a threshold correlation, component analysis platform 102 may classify the multiple values as predictors of each other, and may use one value, of the multiple values, to predict another value of the multiple values.

In some implementations, a predictor may be a ticket, a phrase in a description of a ticket, a metric (e.g., a processor speed metric, a dropped packet metric, etc.), and/or the like. In some implementations, component analysis platform 102 may determine a set of thresholds for the set of predictors. For example, component analysis platform 102 may determine that when tickets received for an instance of a component exceed a threshold inflow rate, a failure for the component is associated with a threshold likelihood. In some implementations, component analysis platform 102 may use an inter quartile range to set the thresholds. For example, component analysis platform 102 may set a threshold as a value greater than or equal to a third quartile for a particular predictor plus 1.5 times the inter quartile range of values for the particular predictor (or less than a first quartile minus 1.5 times the inter quartile range). In this way, component analysis platform 102 may identify outlying values for predictors.

As further shown in FIG. 1A, and by reference numbers 120 and 122, component analysis platform 102 may provide information identifying the set of predictors to second client device 110 (e.g., for display via a user interface), and may receive information identifying a selected subset of predictors. For example, component analysis platform 102 may receive information selecting the subset of predictors and may use the subset of predictors to train a model, as described in more detail herein. Additionally, or alternatively, component analysis platform 102 may automatically select the subset of predictors, such as based on using a machine learning technique, a neural network technique, and/or the like. Additionally, or alternatively, component analysis platform 102 may generate a score for each predictor identifying a predictive value of each predictor in predicting a failure of the instance of the component. In this case, component analysis platform 102 may select a particular predictor or subset of predictors based on the particular predictor or subset of predictors being associated with a threshold score. Based on using a guided machine learning technique based on user selection, a utilization of processing resources may be reduced relative to using a machine learning technique that is based on all of the predictors and without human intervention.

In some implementations, component analysis platform 102 may receive information identifying a predictor not identified in the set of predictors. For example, a user may identify a predictor (e.g., based on experience in having developed program code of the component), such as a particular error known to be thrown by a segment of code. In this case, based on the user identifying the particular error, component analysis platform 102 may monitor for the particular error. In this way, user expertise may be incorporated into machine learning to reduce a likelihood of a failure not being successfully predicted.

As shown in FIG. 1B, and by reference number 124, component analysis platform 102 may train a model to predict a failure of the instance of the component based on the set of predictors (e.g., based on the selected subset of the predictors). For example, component analysis platform 102 may use a long term short memory (LSTM) neural network technique to train the model with a set of thresholds for the set (or subset of predictors) for predicting a failure based on values for the set (or subset) of predictors. In this case, component analysis platform 102 trains the model to predict whether values for predictors (e.g., the set of predictors or the subset of predictors) indicate a future failure case or a non-failure case, and may use the model to analyze values for the predictors in real-time to proactively predict failure cases based on multivariate data (e.g., based on monitoring the instance of the component to determine values for the set of predictors or the subset of predictors). Based on using a set of predictors or a subset of predictors to predict failure, component analysis platform 102 may reduce a utilization of processing resources and/or network resources relative to monitoring each value for each variable relating to the instance of the component (some of which may not be predictors of (e.g., may not have predictive value for predicting) failure).

In some implementations, component analysis platform 102 may generate a recurrent neural network model, a tensor flow deep neural network model, and/or the like based on the LSTM neural network technique to predict failures. For example, component analysis platform 102 may utilize the recurrent neural network model to identify combinations of values for predictors associated with a threshold likelihood of a future failure. In other words, a first value for a first predictor and a second value for a second predictor may have a threshold likelihood of future failure within a threshold period of time, and a third value for the first predictor and a fourth value for the second predictor may have a threshold likelihood of future failure within the threshold period of time.

In some implementations, component analysis platform 102 may generate a model for predicting future values of the predictors, and may determine whether the future values satisfy the thresholds for the predictors to determine whether a failure is predicted. For example, component analysis platform 102 may use LSTM to predict a set of future values, and may use a deep neural network to predict a probability of failure based on the set of future values. In this case, component analysis platform 102 may determine that a first value for a first predictor and a second value for a second predictor may have a threshold likelihood of future failure within a first threshold period of time, and may use the model to predict that the first value and the second value are to occur within a second threshold period of time based on a third value for the first predictor, a fourth value for the second predictor, and a fifth value for a third predictor. In this way, component analysis platform 102 improves an accuracy of prediction relative to other techniques for predicting future values, such as moving average based techniques, autoregressive integrated moving average models, and/or the like.

In some implementations, component analysis platform 102 may update the model in real-time. For example, based on monitoring predictors for the instance of the component and identifying failures, component analysis platform 102 may update the model to improve prediction of subsequent failures. In this case, based on failing to accurately predict a failure, component analysis platform 102 may trigger updating the model, thereby improving accuracy of subsequent predictions.

As further shown in FIG. 1B, and by reference number 126, component analysis platform 102 may determine a predicted failure using the model and based on monitoring the instance of the component. For example, component analysis platform 102 may determine that a system utilization is greater than a threshold, and that system utilization being greater than the threshold is predictive of a failure (e.g., satisfies a threshold likelihood of failure) within a threshold period of time. In some implementations, component analysis platform 102 may determine the predicted value based on a characteristic of usage of the component. For example, the component analysis platform may predict the failure based on a time of day at which a threshold processing utilization for the instance of the component occurs (e.g., a time when the threshold processing utilization is not expected to be occurring), and may not predict the failure based on the threshold processing utilization occurring at another time of day (e.g., another time when the threshold processing utilization is expected to be occurring).

In some implementations, component analysis platform 102 may predict the failure based on monitoring one or more communication channels. For example, component analysis platform 102 may monitor a social media platform to detect messages relating to the instance of the component (e.g., using natural language processing to parse the messages), may determine that a rate of messages detected or a tone of messages (e.g., based on a machine learning sentiment analysis) satisfies a threshold for a predictor relating to the messages, and may predict a failure is to occur for the instance of the component. Additionally, or alternatively, component analysis platform 102 may determine that a key performance indicator (KPI), that is a predictor, satisfies a threshold, and may predict a failure is to occur for the instance of the component.

As further shown in FIG. 1B, component analysis platform 102 may perform a set of response actions based on determining the predicted failure. For example, component analysis platform 102 may transmit an alert 128 identifying the predicted failure to a third client device 130 for display via a user interface. In this case, component analysis platform 102 may provide information identifying, for example, a predicted ticket inflow associated with the predicted failure to enable a project manager to understand the predicted failure.

Additionally, or alternatively, component analysis platform 102 may transmit alerts 132 identifying new task assignments and/or a task schedule to one or more fourth client devices 134 used by one or more developers. For example, component analysis platform 102 may analyze data regarding availability of the one or more developers, skill proficiencies of the one or more developers, a type of the predicted failure, and/or the like, to select the one or more developers and assign tasks to the one or more developers. In some implementations, component analysis platform 102 may utilize data regarding developer availability, developer skill proficiency, failure type, developer location, a failure prioritization (e.g., which failures are to be prioritized for resolution), application type of the component, developer experience (e.g., with the component), and/or the like to generate a machine learning model of task assignment and scheduling, and may use the machine learning model to perform task assignment and schedule. In this way, component analysis platform 102 may automatically ensure that the predicted failure is proactively resolved by the one or more developers.

Additionally, or alternatively, component analysis platform 102 may automatically identify a component patch 136 or another type of fix for the predicted failure based one or more other instances of the component and/or similar components, and may transmit the component patch 136 to an application server 138 to implement the component patch and avoid the predicted failure. For example, component analysis platform 102 may use a machine learning model to process data relating to the predicted failure to automatically determine actions to implement. Additionally, or alternatively, component analysis platform 102 may alter a configuration of the instance of the component (e.g., based on data identifying previous alterations to the configuration of the instance of the component and/or of other instances of the component).

In this way, component analysis platform 102 provides predictive error detection and management for project management, thereby reducing utilization of processing resources relative to performing reactive error detection and management. Moreover, based on predictive error detection and automatic response, component analysis platform 102 reduces an amount of time that a component failure may occur, thereby reducing a utilization of computing resources, organization resources, and/or the like relative to a longer occurring component failure. Furthermore, based on performing the predictive error detection and automatic response based on selected predictors, component analysis platform 102 reduces a utilization of computing resources by reducing an amount of data that is to be monitored to perform the predictive error detection and automatic response.

As indicated above, FIGS. 1A and 1B are provided merely as an example. Other examples are possible and may differ from what was described with regard to FIGS. 1A and 1B.

Figure 2:
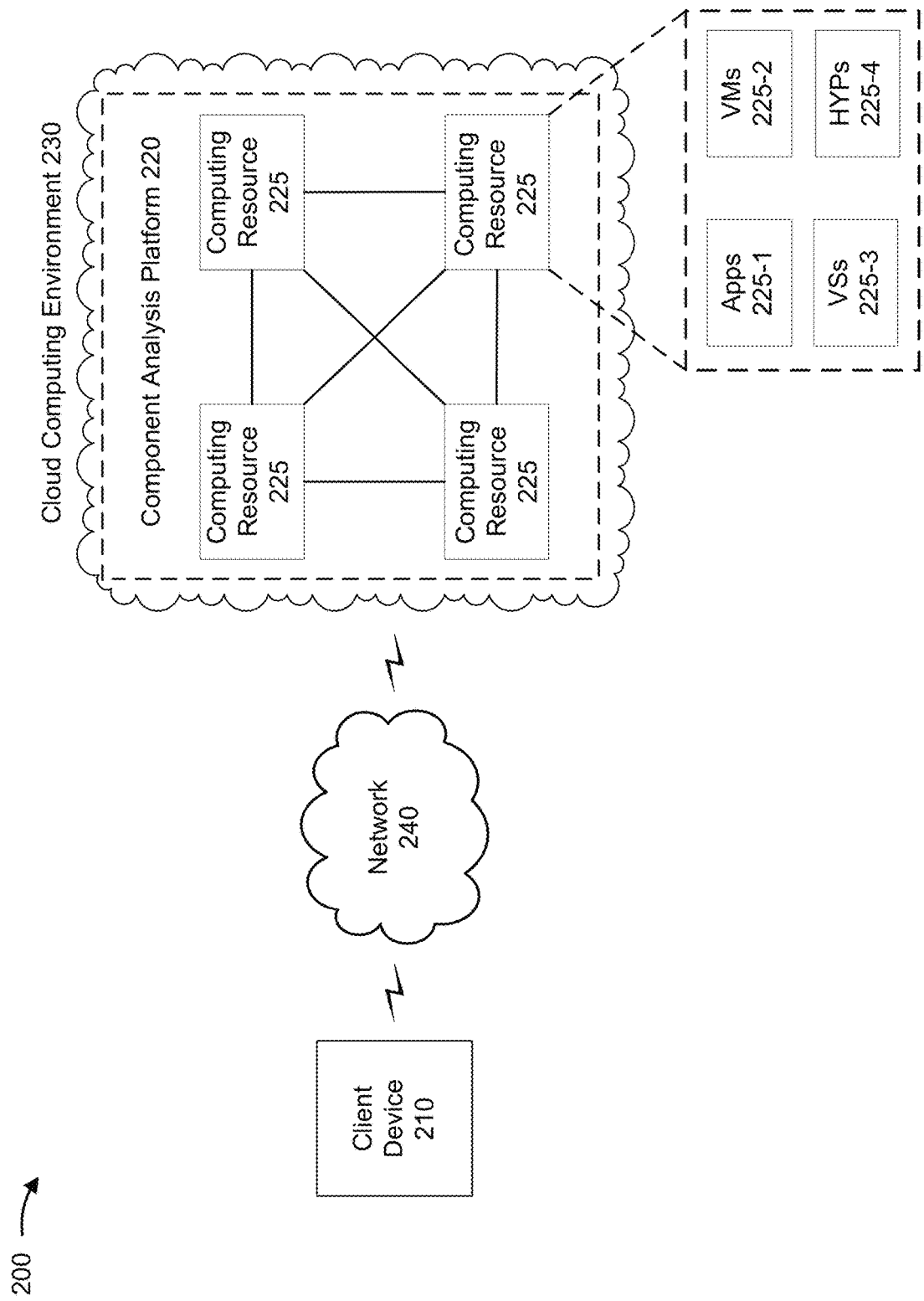
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a component analysis platform 220, a computing resource 225, a cloud computing environment 230, and a network 240. Devices of environment 200 may interconnect via wired connections, wireless connections, or a combination of wired and wireless connections.

Client device 210 includes one or more devices capable of receiving, generating, storing, processing, and/or providing information associated with data processing for component failure determination. For example, client device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Component analysis platform 220 includes one or more computing resources assigned to predict a component failure and automatically implement a response action in connection with the component failure. For example, component analysis platform 220 may be a platform implemented by cloud computing environment 230 that may determine a set of predictors, generate a model of component failure, and use the model of component failure to determine a predicted failure. In some implementations, component analysis platform 220 is implemented by computing resources 225 of cloud computing environment 230.

Cloud computing environment 230 includes an environment that delivers computing as a service, whereby shared resources, services, etc. may be provided to client device 210 and/or component analysis platform 220. Cloud computing environment 230 may provide computation, software, data access, storage, and/or other services that do not require end-user knowledge of a physical location and configuration of a system and/or a device that delivers the services. As shown, cloud computing environment 230 may include a component analysis platform 220 and a computing resource 225.

Computing resource 225 includes one or more personal computers, workstation computers, server devices, or another type of computation and/or communication device. In some implementations, computing resource 225 may host component analysis platform 220. The cloud resources may include compute instances executing in computing resource 225, storage devices provided in computing resource 225, data transfer devices provided by computing resource 225, etc. In some implementations, computing resource 225 may communicate with other computing resources 225 via wired connections, wireless connections, or a combination of wired and wireless connections.

As further shown in FIG. 2, computing resource 225 may include a group of cloud resources, such as one or more applications ("APPs") 225-1, one or more virtual machines ("VMs") 225-2, virtualized storage ("VSs") 225-3, one or more hypervisors ("HYPs") 225-4, and/or the like.

Application 225-1 includes one or more software applications that may be provided to or accessed by client device 210. Application 225-1 may eliminate a need to install and execute the software applications on client device 210. For example, application 225-1 may include software associated with component analysis platform 220 and/or any other software capable of being provided via cloud computing environment 230. In some implementations, one application 225-1 may send/receive information to/from one or more other applications 225-1, via virtual machine 225-2.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS"). A process virtual machine may execute a single program, and may support a single process. In some implementations, virtual machine 225-2 may execute on behalf of a user (e.g., client device 210), and may manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
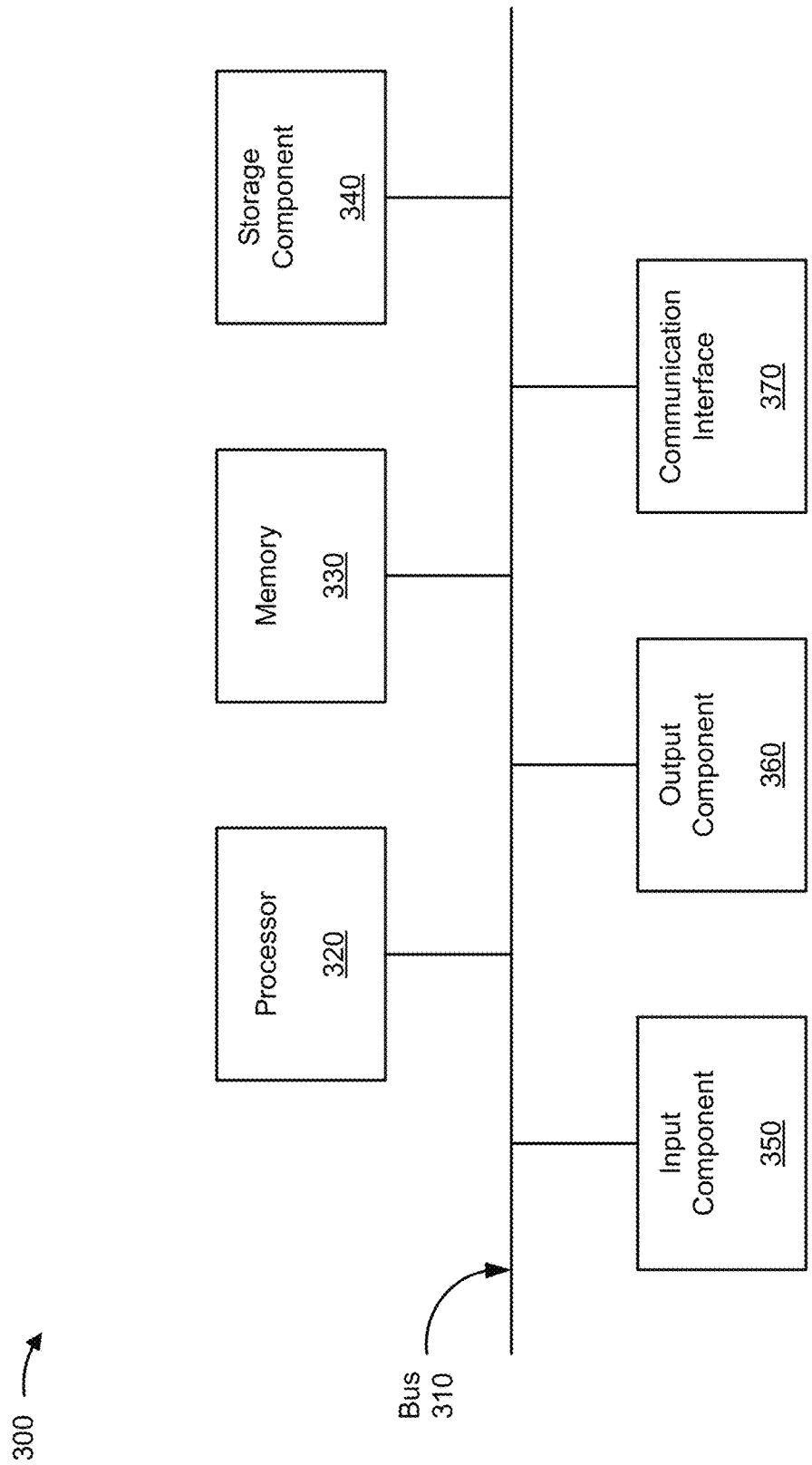
FIG. 3 is a diagram of example components of one or more devices of FIG. 2.

FIG. 3 is a diagram of example components of a device 300. Device 300 may correspond to client device 210, component analysis platform 220, and/or computing resource 225. In some implementations, client device 210, component analysis platform 220, and/or computing resource 225 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
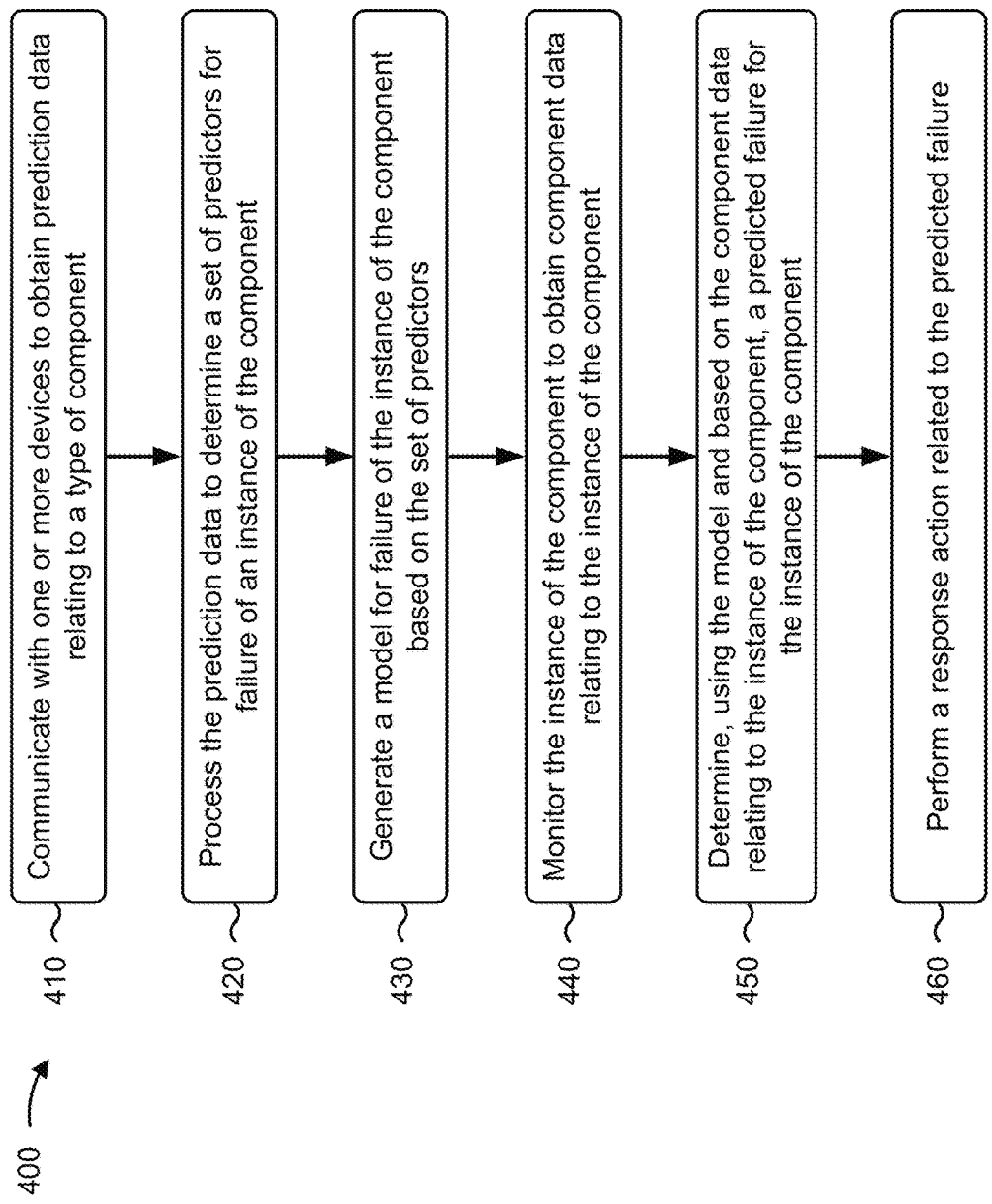
FIG. 4 is a flow chart of an example process for predicting a failure of an instance of a component and performing a response action.

FIG. 4 is a flow chart of an example process 400 for predicting a failure of an instance of a component and performing a response action. In some implementations, one or more process blocks of FIG. 4 may be performed by a component analysis platform (e.g. component analysis platform 220). In some implementations, one or more process blocks of FIG. 4 may be performed by another device or a group of devices separate from or including the component analysis platform, such as a client device (e.g. client device 210) and/or a computing resource (e.g. computing resource 225).

As shown in FIG. 4, process 400 may include communicating with one or more devices to obtain prediction data relating to a type of component (block 410). For example, the component analysis platform (e.g., using computing resource 225, processor 320, memory 330, storage component 340, input component 350, output component 360, communication interface 370, and/or the like) may communicate with one or more devices to obtain prediction data relating to a type of component, as described above in connection with FIGS. 1A-1B.

As further shown in FIG. 4, process 400 may include processing the prediction data to determine a set of predictors for failure of an instance of the component (block 420). For example, the component analysis platform (e.g., using computing resource 225, processor 320, memory 330, storage component 340, and/or the like) may process the prediction data to determine a set of predictors for failure of an instance of the component, as described above in connection with FIGS. 1A-1B.

As further shown in FIG. 4, process 400 may include generating a model for failure of the instance of the component based on the set of predictors (block 430). For example, the component analysis platform (e.g., using computing resource 225, processor 320, memory 330, storage component 340, and/or the like) may generate a model for failure of the instance of the component based on the set of predictors, as described above in connection with FIGS. 1A-1B.

As further shown in FIG. 4, process 400 may include monitoring the instance of the component to obtain component data relating to the instance of the component (block 440). For example, the component analysis platform (e.g., using computing resource 225, processor 320, memory 330, storage component 340, input component 350, output component 360, communication interface 370, and/or the like) may monitor the instance of the component to obtain component data relating to the instance of the component, as described above in connection with FIGS. 1A-1B.

As further shown in FIG. 4, process 400 may include determining, using the model and based on the component data relating to the instance of the component, a predicted failure for the instance of the component (block 450). For example, the component analysis platform (e.g., using computing resource 225, processor 320, memory 330, storage component 340, and/or the like) may determine, using the model and based on the component data relating to the instance of the component, a predicted failure for the instance of the component, as described above in connection with FIGS. 1A-1B.

As further shown in FIG. 4, process 400 may include performing a response action related to the predicted failure (block 460). For example, the component analysis platform (e.g., using computing resource 225, processor 320, memory 330, storage component 340, input component 350, output component 360, communication interface 370, and/or the like) may perform a response action related to the predicted failure, as described above in connection with FIGS. 1A-1B.

Process 400 may include additional implementations, such as any single implementation or any combination of implementations described below and/or in connection with one or more other processes described elsewhere herein.

In some implementations, the prediction data may include a system log, an event log, a performance monitor log, a processor log, and/or a database log. In some implementations, the model may be generated using a long term short memory (LSTM) neural network. In some implementations, the set of predictors may be determined based on a deep neural network (DNN) classifier technique, a recurrent neural network technique, and/or a covariance technique.

In some implementations, the model may be generated based on a set of failure thresholds corresponding to the set of predictors and determined based on the prediction data. In some implementations, the component analysis platform may preprocess the prediction data to organize the prediction data for processing to determine the set of predictors. In some implementations, the response action may be a remediation action to prevent the failure.

In some implementations, the component analysis platform may detect a failure scenario based on monitoring the instance of the component, and adjust the model based on the failure scenario. In some implementations, the component may be a group of connected components. In some implementations, the component analysis platform, when monitoring the instance of the component, may monitor an internal parameter, a database parameter, a web server parameter, an application parameter, and/or a performance parameter.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
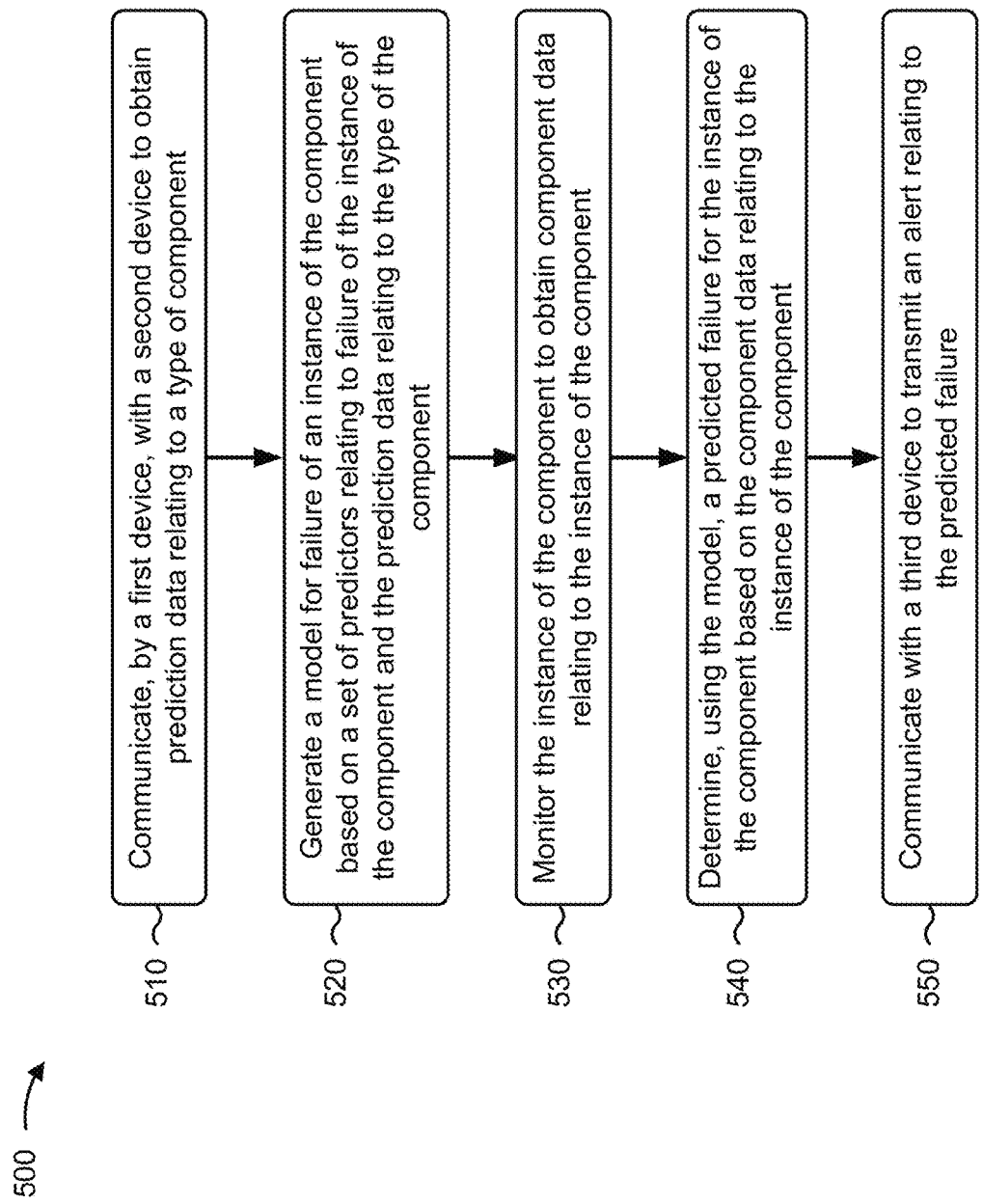
FIG. 5 is a flow chart of an example process for predicting a failure of an instance of a component and transmitting an alert.

FIG. 5 is a flow chart of an example process 500 for predicting a failure of an instance of a component and transmitting an alert. In some implementations, one or more process blocks of FIG. 5 may be performed by a component analysis platform (e.g. component analysis platform 220). In some implementations, one or more process blocks of FIG. 5 may be performed by another device or a group of devices separate from or including the component analysis platform, such as a client device (e.g. client device 210) and/or a computing resource (e.g. computing resource 225).

As shown in FIG. 5, process 500 may include communicating with a second device to obtain prediction data relating to a type of component (block 510). For example, the component analysis platform (e.g., using computing resource 255, processor 320, memory 330, storage component 340, input component 350, output component 360, communication interface 370, and/or the like) may communicate with a second device to obtain prediction data relating to a type of component, as described above in connection with FIGS. 1A-1B.

As shown in FIG. 5, process 500 may include generating a model for failure of an instance of the component based on a set of predictors relating to failure of the instance of the component, and the prediction data relating to the type of the component (block 520). For example, the component analysis platform (e.g., using computing resource 225, processor 320, memory 330, storage component 340, and/or the like) may generate a model for failure of an instance of the component based on a set of predictors relating to failure of the instance of the component, and based on the prediction data relating to the type of the component, as described above in connection with FIGS. 1A-1B.

As further shown in FIG. 5, process 500 may include monitoring the instance of the component to obtain component data relating to the instance of the component (block 530). For example, the component analysis platform (e.g., using computing resource 225, processor 320, memory 330, storage component 340, input component 350, output component 360, communication interface 370, and/or the like) may monitor the instance of the component to obtain component data relating to the instance of the component, as described above in connection with FIGS. 1A-1B.

As further shown in FIG. 5, process 500 may include determining, using the model, a predicted failure for the instance of the component based on the component data relating to the instance of the component (block 540). For example, the component analysis platform (e.g., using computing resource 225, processor 320, memory 330, storage component 340, and/or the like) may determine, using the model, a predicted failure for the instance of the component based on the component data relating to the instance of the component, as described above in connection with FIGS. 1A-1B.

As further shown in FIG. 5, process 500 may include communicating with a third device to transmit an alert relating to the predicted failure (block 550). For example, the component analysis platform (e.g., using computing resource 225, processor 320, memory 330, storage component 340, input component 350, output component 360, communication interface 370, and/or the like) may communicate with a third device to transmit an alert relating to the predicted failure, as described above in connection with FIGS. 1A-1B.

Process 500 may include additional implementations, such as any single implementation or any combination of implementations described below and/or in connection with one or more other processes described elsewhere herein.

In some implementations, each predictor, of the set of predictors, may be associated with a failure threshold, and the component analysis platform, when determining the predicted failure, may determine that at least one failure threshold of at least one predictor of the set of predictors is predicted to be satisfied. In some implementations, the component analysis platform may generate a user interface to identify the predicted failure, and may, when communicating with the third device, provide the user interface for display to identify the predicted failure.

In some implementations, the component analysis platform may, when generating the model, generate the model based on a subset of prediction data relating to a similar type of component to the type of component. In some implementations, the component analysis platform may, when generating the model, perform natural language processing using a machine learning technique to process the prediction data. In some implementations, the component analysis platform may determine a predicted impact to an entity of the predicted failure, and perform a response action corresponding to the predicted impact.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 400 may be performed in parallel.

Figure 6:
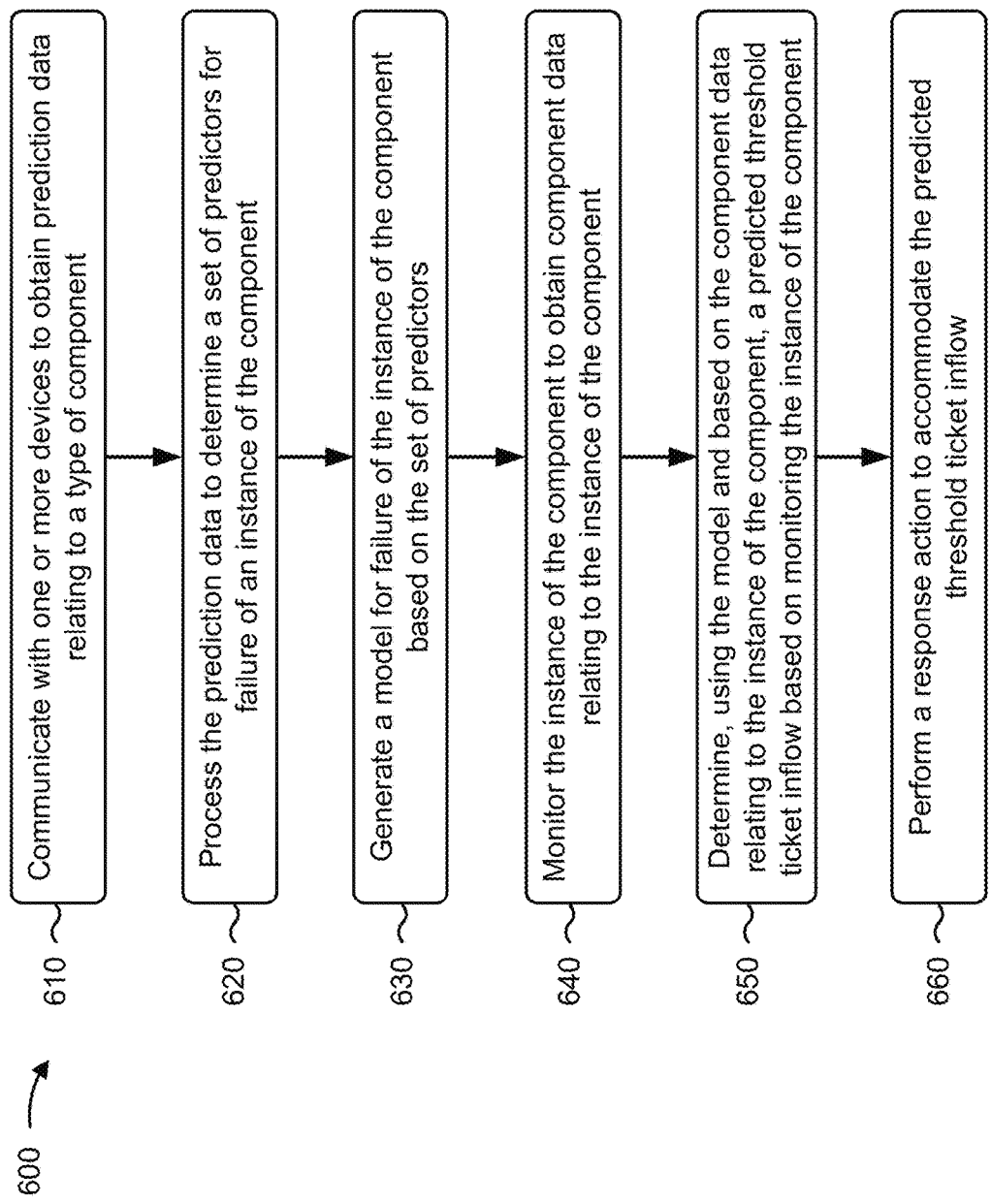
FIG. 6 is a flow chart of an example process for predicting a failure of an instance of a component and performing a response action.

FIG. 6 is a flow chart of an example process 600 for predicting a failure of an instance of a component and performing a response action. In some implementations, one or more process blocks of FIG. 6 may be performed by a component analysis platform (e.g. component analysis platform 220). In some implementations, one or more process blocks of FIG. 6 may be performed by another device or a group of devices separate from or including the component analysis platform, such as a client device (e.g. client device 210) and/or a computing resource (e.g. computing resource 225).

As shown in FIG. 6, process 600 may include communicating with one or more devices to obtain prediction data relating to a type of component (block 610). For example, the component analysis platform (e.g., using computing resource 225, processor 320, memory 330, storage component 340, input component 350, output component 360, communication interface 370, and/or the like) may communicate with one or more devices to obtain prediction data relating to a type of component, as described above in connection with FIGS. 1A-1B.

As further shown in FIG. 6, process 600 may include processing the prediction data to determine a set of predictors for failure of an instance of the component (block 620). For example, the component analysis platform (e.g., using computing resource 225, processor 320, memory 330, storage component 340, and/or the like) may process the prediction data to determine a set of predictors for failure of an instance of the component, as described above in connection with FIGS. 1A-1B.

As further shown in FIG. 6, process 600 may include generating a model for failure of the instance of the component based on the set of predictors (block 630). For example, the component analysis platform (e.g., using computing resource 225, processor 320, memory 330, storage component 340, and/or the like) may generate a model for failure of the instance of the component based on the set of predictors, as described above in connection with FIGS. 1A-1B.

As further shown in FIG. 6, process 600 may include monitoring the instance of the component to obtain component data relating to the instance of the component (block 640). For example, the component analysis platform (e.g., using computing resource 225, processor 320, memory 330, storage component 340, input component 350, output component 360, communication interface 370, and/or the like) may monitor the instance of the component to obtain component data relating to the instance of the component, as described above in connection with FIGS. 1A-1B.

As further shown in FIG. 6, process 600 may include determining, using the model and based on the component data relating to the instance of the component, a predicted threshold ticket inflow based on monitoring the instance of the component (block 650). For example, the component analysis platform (e.g., using computing resource 225, processor 320, memory 330, storage component 340, and/or the like) may determine, using the model and based on the component data relating to the instance of the component, a predicted threshold ticket inflow based on monitoring the instance of the component, as described above in connection with FIGS. 1A-1B.

As further shown in FIG. 6, process 600 may include performing a response action to accommodate the predicted threshold ticket inflow (block 660). For example, the component analysis platform (e.g., using computing resource 225, processor 320, memory 330, storage component 340, input component 350, output component 360, communication interface 370, and/or the like) may perform a response action to accommodate the predicted threshold ticket inflow, as described above in connection with FIGS. 1A-1B.

Process 600 may include additional implementations, such as any single implementation or any combination of implementations described below and/or in connection with one or more other processes described elsewhere herein.

In some implementations, the response action may include proactively altering a task schedule to accommodate the predicted threshold ticket inflow. In some implementations, the response action may include automatically assigning tickets to accommodate the predicted threshold ticket inflow. In some implementations, the response action may include automatically applying a fix to avoid the predicted threshold ticket inflow.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, component analysis platform 220 may reduce a utilization of computing resources relative to reactive component failure monitoring by reducing a likelihood of component failure, identifying component failure fixes in advance of component failure to reduce a duration of a component failure, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
communicate with one or more devices to obtain prediction data relating to a type of component,
wherein the prediction data includes:
log data,
entity data associated with a particular client, and
real-time or near-real time component data;
process the prediction data to determine a set of predictors for failure of an instance of the component;
receive information identifying a selected subset of predictors of the set of predictors,
the selected subset of predictors being associated with a threshold score;
generate a model for failure of the instance of the component based on the selected subset of predictors;
monitor the instance of the component to obtain component data relating to the instance of the component;
determine, using the model and based on the component data relating to the instance of the component, a predicted failure for the instance of the component; and
perform a response action related to the predicted failure.

2. The device of claim 1, wherein the prediction data includes at least one of:
a system log,
an event log,
a performance monitor log,
a processor log, or
a database log.

3. The device of claim 1, wherein the model is generated using a long term short memory (LSTM) neural network.

4. The device of claim 1, wherein the set of predictors are determined based on at least one of:
a deep neural network (DNN) classifier technique,
a recurrent neural network technique, or
a covariance technique.

5. The device of claim 1, wherein the model is generated based on a set of failure thresholds corresponding to the set of predictors and determined based on the prediction data.

6. The device of claim 1, where the one or more processors are further to:
preprocess the prediction data to organize the prediction data for processing to determine the set of predictors.

7. The device of claim 1, wherein the response action is a remediation action to prevent the failure.

8. The device of claim 1, wherein the one or more processors are further to:
detect a failure scenario based on monitoring the instance of the component and adjust the model based on the failure scenario.

9. The device of claim 1, wherein the component is a group of connected components.

10. The device of claim 1, wherein the one or more processors, when monitoring the instance of the component, are to:
monitor at least one of: an internal parameter, a database parameter, a web server parameter, an application parameter, or a performance parameter.

11. A method, comprising:
communicating, by a first device, with a second device to obtain prediction data relating to a type of component,
wherein the prediction data includes:
log data,
entity data associated with a particular client, and
real-time or near-real time component data;
receiving, by the first device, information identifying a selected subset of predictors of a set of predictors,
the selected subset of predictors being associated with a threshold score;
generating, by the first device, a model for failure of an instance of the component based on:
the selected subset of predictors relating to failure of the instance of the component, and
the prediction data relating to the type of the component;
monitoring, by the first device, the instance of the component to obtain component data relating to the instance of the component;
determining, by the first device and using the model, a predicted failure for the instance of the component based on the component data relating to the instance of the component; and
communicating, by the first device, with a third device to transmit an alert relating to the predicted failure.

12. The method of claim 11, wherein each predictor, of the set of predictors, is associated with a failure threshold, and wherein determining the predicted failure comprises:
determining that at least one failure threshold of at least one predictor of the set of predictors is predicted to be satisfied.

13. The method of claim 11, further comprising:
generating a user interface to identify the predicted failure; and
wherein communicating with the third device comprises:
providing the user interface for display to identify the predicted failure.

14. The method of claim 11, wherein
the selected subset of predictors relate to a similar type of component to the type of component.

15. The method of claim 11, wherein generating the model comprises:
performing natural language processing using a machine learning technique to process the prediction data.

16. The method of claim 11, further comprising:
determining a predicted impact to an entity of the predicted failure; and
performing a response action corresponding to the predicted impact.

17. A non-transitory computer-readable medium storing instructions, the instructions comprising:
one or more instructions that, when executed by one or more processors, cause the one or more processors to:
communicate with one or more devices to obtain prediction data relating to a type of component,
wherein the prediction data includes:
log data,
entity data associated with a particular client, and
real-time or near-real time component data;
process the prediction data to determine a set of predictors for failure of an instance of the component;
receive information identifying a selected subset of predictors of the set of predictors, the selected subset of predictors being associated with a threshold score;

generate a model for failure of the instance of the component based on the selected subset of predictors;

monitor the instance of the component to obtain component data relating to the instance of the component;

determine, using the model and based on the component data relating to the instance of the component, a predicted threshold ticket inflow based on monitoring the instance of the component; and perform a response action to accommodate the predicted threshold ticket inflow.

18. The non-transitory computer-readable medium of claim 17, wherein the response action includes:

proactively altering a task schedule to accommodate the predicted threshold ticket inflow.

19. The non-transitory computer-readable medium of claim 17, wherein the response action includes:

automatically assigning tickets to accommodate the predicted threshold ticket inflow.

20. The non-transitory computer-readable medium of claim 17, wherein the response action includes:

automatically applying a fix to avoid the predicted threshold ticket inflow.

* * * * *